(No Model.) 4 Sheets—Sheet 1.
W. H. EVANS.
MACHINE FOR MOLDING STONE SLABS.
No. 478,227. Patented July 5, 1892.
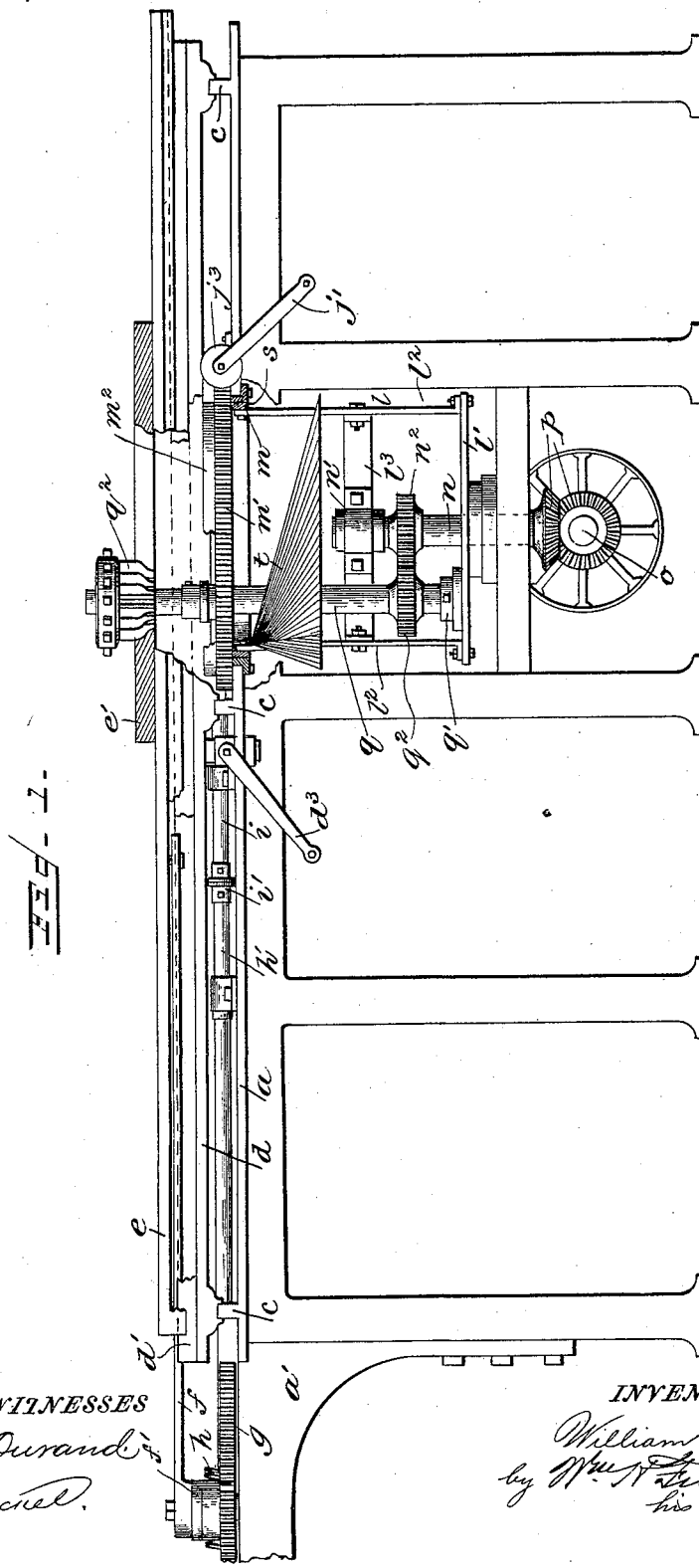
WITNESSES
F. L. Ourand
E. A. Finckel
INVENTOR
William H. Evans.
by Wm. N. Finckel
his Attorney

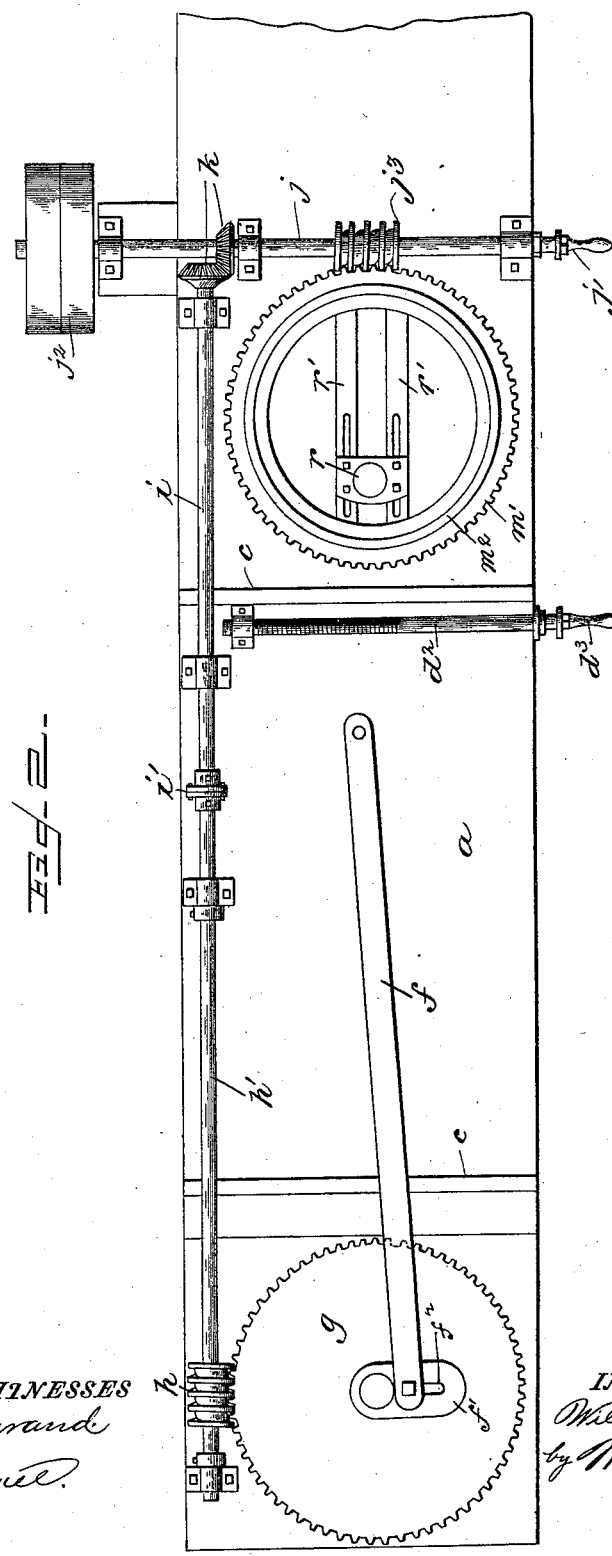

(No Model.) 4 Sheets—Sheet 3.
W. H. EVANS.
MACHINE FOR MOLDING STONE SLABS.
No. 478,227. Patented July 5, 1892.
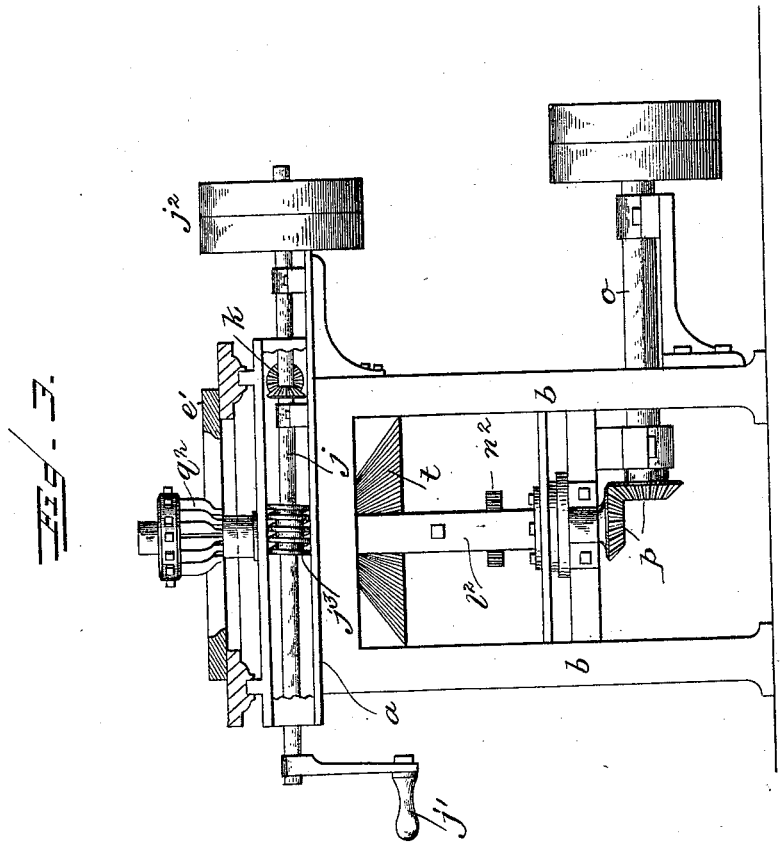
WITNESSES
F. L. Ourand
E. A. Finckel
INVENTOR
William H. Evans.
by Wm. H. Finckel
his Attorney (No Model.) 4 Sheets—Sheet 4.
W. H. EVANS.
MACHINE FOR MOLDING STONE SLABS.
No. 478,227. Patented July 5, 1892.
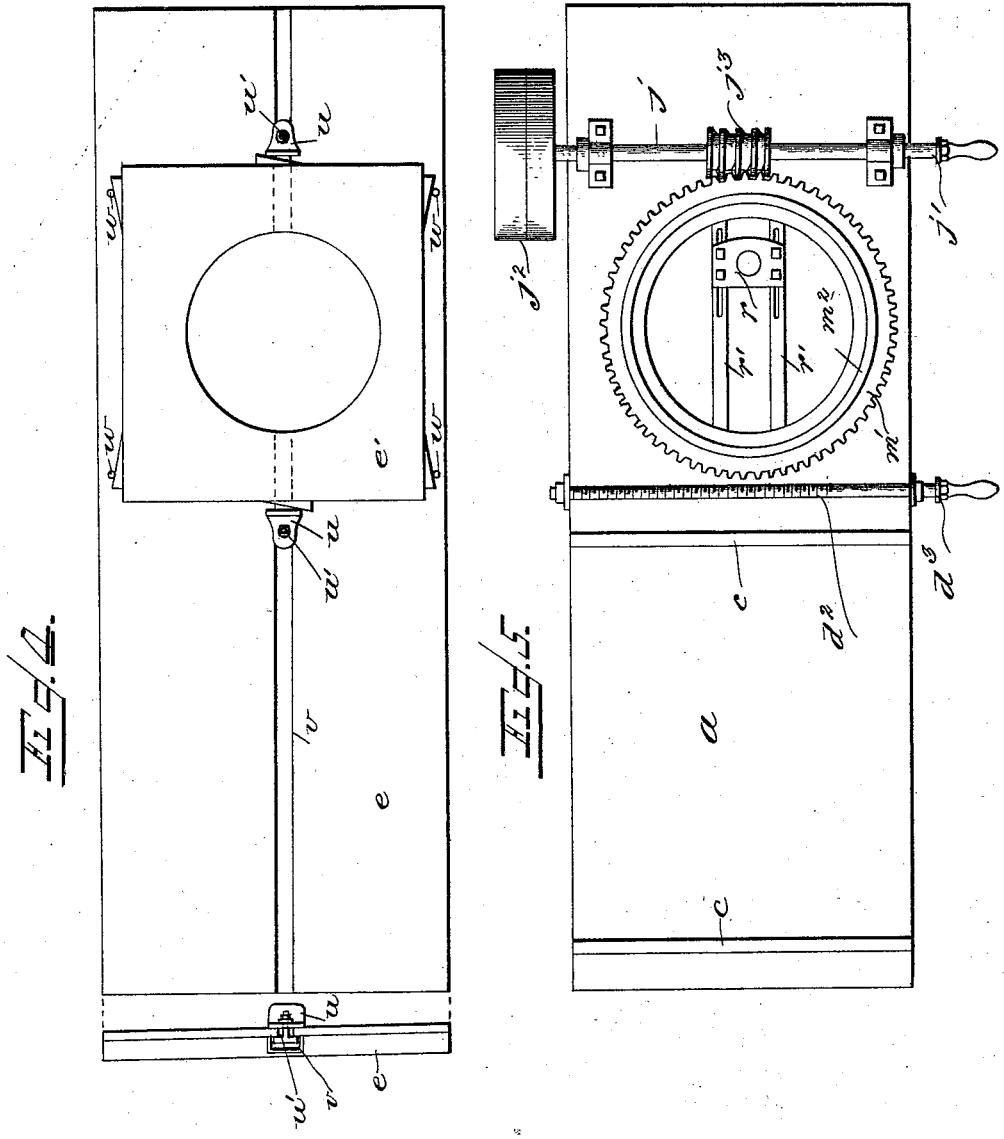
WITNESSES
F. L. Ourand
E. A. Fincnel
INVENTOR
William H. Evans.
by Wm. F. Fincnel
his Attorney

UNITED STATES PATENT OFFICE.

WILLIAM H. EVANS, OF BALTIMORE, MARYLAND.

MACHINE FOR MOLDING STONE SLABS.

SPECIFICATION forming part of Letters Patent No. 478,227, dated July 5, 1892.

Application filed January 16, 1892. Serial No. 418,302. (No model.)

*To all whom it may concern:*

Be it known that I, WILLIAM H. EVANS, a citizen of the United States, residing at Baltimore, in the State of Maryland, have invented a certain new and useful Improvement in Machines for Molding Stone Slabs, of which the following is a full, clear, and exact description.

This invention is in the nature of an improvement upon the stone-molding machine shown in Figures 10 to 18 of the drawings of my Letters Patent No. 462,760, dated November 10, 1891; and the main objects of the invention are, first, to provide a simplified form of cutter-carrier; second, to carry off the dust of the cutter; third, to simplify the conversion of the machine for use for oval and circular work.

I will describe the principle of my invention first and the best mode in which I have contemplated applying that principle, and will then particularly point out and distinctly claim the part, improvement, or combination which I claim as my invention.

In the accompanying drawings, illustrating my invention, in the several figures of which like parts are similarly designated, Fig. 1 is a front elevation with the work-tables broken out about the cutter. Fig. 2 is a plan of the frame-work and reciprocator with the superstructure removed. Fig. 3 is an end elevation showing the work in cross-section. Fig. 4 is a plan and end view of the main work-table, and Fig. 5 is a plan view of the circular machine.

For convenience the machine illustrated in Figs. 1 to 4 will be designated the "combined machine," because by it both oval and circular work can be done, and the machine shown in Fig. 5 will be called the "single machine," because by it only circular work can be done.

The bed or frame-work $a$ may be supported upon legs $b$, and has the transverse rails $c$ upon which the table $d$ is movable. The table $d$ has longitudinal rails $d'$, upon which is movable the table $e$, and this table supports the work $e'$. The table $d$ is movable transversely of the bed by means of a screw $d^2$, secured in bearings on the bed, which screw engages a nut depending from the table in usual manner, said screw having a hand-crank $d^3$ to rotate it. This movement of table $d$ serves to adjust the work to the cutter. The table $e$ is movable longitudinally by means of a rod $f$, connected to it and to a rotary worm-wheel $g$, which is journaled in the bed or in a bracket $a'$, which may be bolted to the frame-work or bed. The rod $f$ is adjustably connected with the worm-wheel, as by a radially-slotted arm $f'$ or a slot or groove in the worm-wheel, and a bolt $f^2$ to provide for varying the throw or travel of the table in accordance with the diameters of the opening to be molded. This worm-wheel, because of analogy of function, corresponds with the reciprocator of the patent referred to. The reciprocator is rotated by a worm $h$ on a shaft $h'$, which shaft is supported upon the bed and is connected with shaft $i$ by means of a separable or disconnecting coupling device $i'$ of any suitable construction. $j$ is a shaft having a crank $j'$ for rotating it by hand and also supplied with power-pulleys $j^2$. The shafts $i$ and $j$ are connected by miter-wheels $k$.

The carrier $l$ may be tubular, as in the patent referred to; but by preference it is a skeleton composed of a base $l'$, opposite uprights $l^2$, bolted thereto and to a depending flange $m$ of an annular worm-gear $m'$, and a cross-bar $l^3$, bolted to the uprights. The shaft $n$ is arranged in the frame-work to afford an axis of rotation for the carrier. The shaft $n$ is driven by a power-shaft $o$, with which it is geared by miter or other toothed wheels $p$. The upper end of the shaft $n$ is arranged in a journal-box $n'$ on the cross-bar $l^3$. The annular worm-gear $m'$ is rotated by a worm $j^3$ on the shaft $j$ to rotate the carrier. The cutter-spindle $q$ is stepped at $q'$ in the base of the carrier, and its upper end is arranged in a box $r$, which is adjustably supported upon slotted radial bars $r'$ of the annular worm-gear $m'$. By adjustment of the cutter-spindle's box toward and from the center of the worm-gear $m'$ the cutter-spindle will be vibrated in its step and inclined so that the diameter of the circular path of travel of the cutter incident to the rotation of the carrier may be varied in accordance with the diameters of the openings to be molded. The cutter-spindle has the cutter-head $q^2$ applied to its upper end. The cutter-spindle is driven by deep-toothed gear-wheels $q^3$ and $n^2$, respectively, on the spindle and short shaft $n$, as in the patent referred to.

The annular worm-gear $m'$ is arranged in a bearing, ring, or bushing $s$, secured to the edges of an opening in the bed, and the flange $m$ fits within this ring as an axle in its box. The upper face of the ring-gear $m'$ is provided with a flange $m^2$ to arrest the escape of the stone dust toward the teeth.

A dust-deflector $t$ is secured in the carrier and projects beyond it at an incline so as to protect the subjacent gearing and to throw out the dust from the cutter. This dust-deflector may be of galvanized iron, zinc, or other metal, and may be corrugated or otherwise constructed with stiffening mediums. It will be observed that the top of the carrier (the annular gear $m'$) is open for the free downward passage of the dust onto this deflector. By these means I avoid the difficulty and injurious annoyance attendant upon the use of an underneath cutter, and am enabled to avail of the many advantages incident to the underneath as compared with the overhead cutter. Some of these advantages are the dispensing entirely with the goose-neck standard of the overhead cutter and the necessity for raising and lowering the cutter-head to get at the work, the consequent economy of production of the machine and space for its installation, the greater relative compactness of the machine, the greater accessibility of its parts for cleaning, oiling, and repair, and its reduced weight.

It will be understood that the cutter travels in a fixed circular path by reason of the rotation of the carrier; but as the reciprocator moves the work in a right line it is evident that the cutting will be done upon an oval or ellipse and not a circle. If circular work alone is to be done, the reciprocator is thrown out of operation by disconnecting the coupling $i'$.

Where circular work alone is to be done, then the reciprocator and the connecting-gearing may be omitted, as indicated in Fig. 5.

I do not limit my invention to the precise means shown for synchronizing the reciprocator and carrier, but have shown positive gearing as being, in my judgment, the best.

The work may be secured to the table by knees $u$, (see Fig. 4,) adjustably fitted to the table $e$ by inverted-T bolts $u'$, arranged in a complemental groove or slot $v$ in the table $e$. Pins $w$ are arranged about the opening $e^2$ in the table, through which the cutter-head projects. The work $x$ is placed between these pins and clamps and wedged in, and thus securely held to the table, though other means may be used to clamp the work to the table.

What I claim is—

1. In a machine for molding stone slabs, the combination, with the frame-work, its bed, and work-table, of a cutter-spindle and a skeleton carrier therefor, comprising a base, opposite uprights secured thereto, an annular worm-gear having a depending flange to which the uprights are fastened, a ring or bushing in the bed in which the flange is fitted to rotate, and a bearing for the spindle in said gear, substantially as described.

2. In a machine for molding stone slabs, the frame-work and tables having openings for the passage of the cutter-head, in combination with a cutter-spindle and cutter-head thereon and a carrier for such spindle, said carrier comprising a body portion, an annular worm-gear having a depending flange by which the body portion and worm-gear are connected, and a bushing in the frame-work in which said flange has a bearing, substantially as described.

3. In a machine for molding stone slabs, the combination, with the frame-work and the work-table having openings for the passage of the cutter-head and escape of the dust, of a cutter-spindle and head thereon, a rotary carrier for such spindle, having its top made as an annular worm-gear, which is provided with the upper annular flange $m^2$, and a subjacent dust-deflector, substantially as described.

4. In a machine for molding stone slabs, the frame-work and work-tables having openings for the passage of the cutter-head and escape of the dust, combined with a cutter-spindle and head, a cutter-carrier having its top made as an annular gear-wheel supported in the opening in the frame-work and thereby permitting the escape of the dust through it, and a subjacent dust-deflector, substantially as described.

5. In a machine for molding stone slabs, the frame-work and work-tables having openings for the passage of the cutter-head and escape of the dust, combined with a cutter-carrier having its top made as an annular gear-wheel supported in the opening in the frame-work, and a dust-deflector supported by such carrier, substantially as described.

6. In a machine for molding stone slabs, the combination, with a frame-work, work-tables, a cutter-carrier, its worm-gear, and a driving-shaft for such worm-gear, of a reciprocator, a rod connecting it and the work-tables to move them longitudinally of the frame-work and in a right line, a worm-shaft synchronously connecting such reciprocator with the driving-shaft of the worm-gear of the carrier, and a separable or disconnecting coupling device in said shaft, whereby the reciprocator may be thrown into and out of operation to enable the machine to be used, respectively, for oval and for circular work, substantially as described.

In testimony whereof I have hereunto set my hand this 14th day of January, A. D. 1892.

WILLIAM H. EVANS.

Witnesses:
PH. H. HOFFMAN,
J. A. O. TUCKER.